Feb. 9, 1971   E. G. ROBILLARD   3,561,168
GRINDING MACHINE
Filed April 12, 1968   2 Sheets-Sheet 1

EDWARD G. ROBILLARD
INVENTOR.

BY

United States Patent Office 3,561,168
Patented Feb. 9, 1971

3,561,168
GRINDING MACHINE
Edward G. Robillard, Leicester, Mass., assignor to The Heald Machine Company, Worcester, Mass., a corporation of Delaware
Filed Apr. 12, 1968, Ser. No. 720,912
Int. Cl. B24b 49/00
U.S. Cl. 51—165.75   7 Claims

ABSTRACT OF THE DISCLOSURE

This invention relates to a grinding machine and, more particularly, to apparatus having a grinding cycle regulated by the use of electrical pulses, the pulses serving to regulate not only the cross-feed position, but also operate a visual readout of that position.

BACKGROUND OF THE INVENTION

In the operation of a grinding machine, a complex grinding cycle can readily be regulated by the use of electrical pulses operating through a pulse-operated actuator in the cross-feed mechanism. In the past, however, the more important change points in the cycle have been determined by the use of switches mounted on the base which have been operated by contact by a cross-feed element. These switches are difficult to adjust accurately even during set-up. It is even more difficult, if not impossible, to do so during the operation of the machine. These and other difficulties experienced with the prior art devices have been obviated in a novel manner by the present invention.

It is, therefore, an outstanding object of the invention to provide a grinding machine having a pulse-operated feed mechanism wherein the change points in the cycle are determined from the pulses, rather than mechanical switching.

Another object of this invention is the provision of an automatic grinding machine using a pulse-controlled cycle.

A further object of the present invention is the provision of a grinding machine in which the exact position of the cross-slide is continuously visually indicated.

It is another object of the instant invention to provide a grinding machine in which the NEW WHEEL, COARSE COMPENSATION, CYCLE START, and WORN WHEEL points are readily and accurately adjusted either during set-up or during operation.

A still further object of the invention is the provision of a grinding machine in which the operator can read visually at any given time during the operation the amount of the abrasive wheel which remains.

With these and other objects in view, as will be apparent to those skilled in the art, the invention resides in the combination of parts set forth in the specification and covered by the claims appended hereto.

SUMMARY OF THE INVENTION

In general, the invention relates to a grinding machine having a base on which are mounted a workhead and a wheelhead, having feed means including a main stepping motor and a screw for producing relative movement between the workhead and the wheelhead, having control means for introducing electrical pulses to the stepping motor to produce a grinding cycle, having a secondary stepping motor also connected to the control means to receive the same electrical pulses as the main stepping motor, having a counter driven by the secondary stepping motor, and having switches operated by the counter for operation at predetermined counts.

More specifically, the switches include a NEW WHEEL switch, a COARSE COMPENSATION switch, a CYCLE START switch, and a WORN WHEEL switch. The count in the cross-feed at which each switch operates is adjustable.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
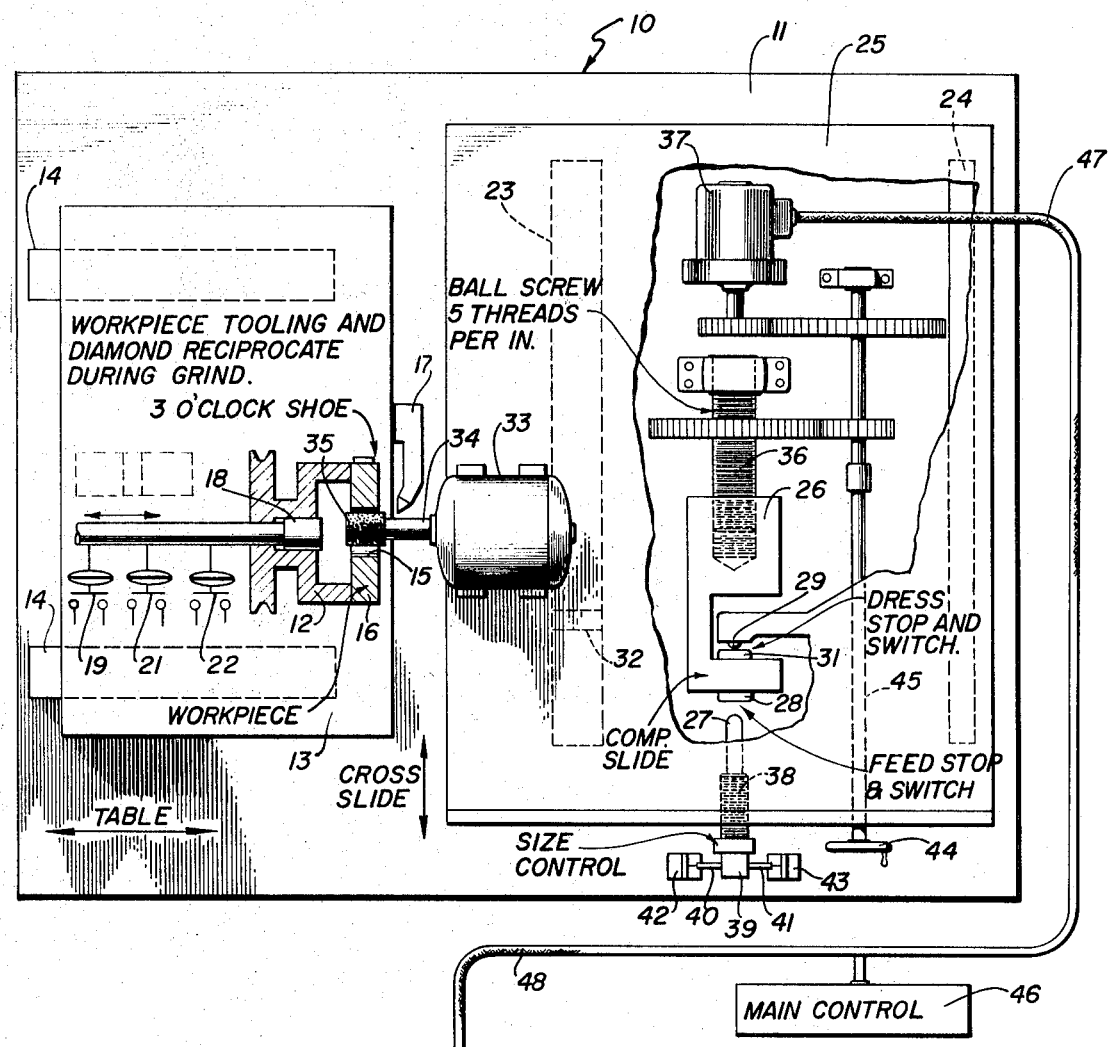
FIG. 1 is a schematic view of a grinding machine embodying the principles of the present invention.

The grinding machine, indicated generally by the reference numeral 10, is of the general type shown and described in the copending patent applications of Robillard, Ser. No. 482,846, filed Aug. 26, 1965, now Patent No. 3,403,480 dated Oct. 1, 1968, and of Robillard et al., Ser. No. 672,222, filed Oct. 2, 1967, now Patent No. 3,503,158 dated Mar. 31, 1970.

Generally speaking, the present invention uses a stop which contacts the compensation slide portion of the wheelhead and makes electrical as well as mechanical contact, so that the final size gage becomes operative. Then, instead of the stop being retracted, the compensation slide (and, therefore, the wheelhead) is moved by a stepping motor to the rear of the machine at a preset rate, i.e., .000050″ increments in the preferred embodiment. In most cases, the rate would be set at a maximum (say 100 steps per sec. on the stepping motor) and the slide will only step far enough to break electrical contact between the slide and the stop. This occurs rapidly in small increments, so that there is very low force buildup on the stop. The compensation slide acts, therefore, as a "floating stop." This stop will be synchronized with the wheelhead cross-slide when the dress signal is obtained from the size gage. At this time, the stepping motor stops the feed and a circuit is energized to remember the number of pulses of feed required. The cross-slide is reset to "zero" on the start feed position. After the dressing operation has been completed, the compensation slide is retracted and, because the force or pressure of the wheel on the workpiece is always the same at the dress point, the retraction setting does not have to be set for the worst case condition.

The cross-slide will next feed until the stop re-contacts the compensation slide. When this happens, the compensation slide under the impetus of the stepping motor will retract to the dress size position at the 100 step/second rate, the number of pulses required to do this being retrieved from the memory circuit. When this position (at which the gage had previously indicated that dress should take place) is reached, the fine finish feed takes place by moving the compensation slide rearwardly. Eventually, the gage will indicate the arrival of the workpiece size; this will terminate the fine feed and grinding will continue under sparkout conditions due to the pressure of the deflection in the spindle until the gage indicates that the final size has been reached.

At final size, the compensation slide will be reset to the "zero" or start feed position. A feedback circuit will also be energized to compare the number of pulses required to obtain the final size to a standard number of pulses. If the number of feed pulses is below the "EARLY GAGE" limit, a feedback signal will shift the "FIRST SIZE" point to a smaller point. On the other hand, if it is above the "LATE GAGE" limit, the feedback signal will shift the "FIRST SIZE" point to a larger point. If the number of pulses is between the two limits (NORMAL GAGE), there will be no feedback signal.

The grinding machine 10 consists of a base 11 on which is mounted a workhead 12 carried on a workhead table 13 which is capable of sliding motion on ways 14 extending parallel to the axis of a surface of revolution 15 of a workpiece 16 which is to be finished. Also mounted on the workhead table 13 is a dressing apparatus 17 having a diamond. Extending through the workhead 12 for engagement with the workpiece bore (surface of revolution 15) is a pneumatic gage 18 of the type shown and described in the patent of Schmidt et al., No. 2,771,714 of Nov. 27, 1956. This gage is suitably connected to suitable pressure switches, such as a pressure switch 19, capable of indicating when the size of the bore 15 has reached the size at which it is necessary to dress the wheel, a pressure switch 21 indicating when the bore has reached an intermediate size at which the finish grind is to be terminated, and a pressure switch 22 which is operative when the size of the bore has reached the final size.

Also mounted on the base 11 is a wheelhead table 25 which is slidable on ways 23 and 24 to move transversely of the axis of the surface of revolution 15. Both the table 13 and the table 25 are movable under the impetus of hydraulic linear actuators to produce their respective motions. Lying on the base 11 and slidable over its surface is a compensation slide 26. Extending from the wheelhead table 25 is a finger 27 in line to engage a forwardly-facing feed stop 28 which is mounted on the forward face of the compensation slide. The finger 27 and the feed stop 28 are also arranged as an electrical switch for placing the pneumatic gage 18 in operative condition on occasion.

The wheelhead table 25 is also provided with a downwardly-extending finger 29 which is in position to engage a rearwardly-directed dress stop 31 formed on the compensation slide 26. There is a considerably greater distance between this finger 27 and the finger 29 than there is between the feed stop 28 and the dress stop 31, so that the table 25 is capable of a wide range of operative movement between those two portions and a suitable hydraulic cylinder 32. This cylinder is arranged with the usual servo valves and so on to produce very quick action in moving the wheelhead table 25 from a first position where the finger 27 engages the feed stop 28 to the second position at which the finger 29 engages the dress stop 31. Mounted on the wheelhead 25 is a wheelhead 33 carrying a rotatable spindle 34, the outer end of which carries an abrasive wheel 35. The cylinder 32 is provided with hydraulic fluid at a carefully regulated pressure so that it is possible to predetermine the force producible by the cylinder and use that force for engagement of the abrasive wheel 35 with the workpiece 16 according to the well-known "controlled-force" grinding principle. The back end of the compensation slide 26 is threadedly engaged with a screw 36 which is driven through suitable gearing by a stepping motor 37. The stepping motor, the screw 36, and the compensation slide 26 operate to give a readily-selected accurate compensation at the time of dress in accordance with the teaching set forth in the said patent application of Robillard Ser. No. 482,846.

The finger 27 is engaged with the front of the cross-slide or wheelhead table 25 through a screw 38 to provide a certain degree of adjustment. This adjustment takes place by a ratchet 39 mounted on the front of the screw 38 and operated in opposite directions by pawls 40 and 41 slidable back and forth by cylinders 42 and 43. A handwheel 44 operates through a rod 45 to permit manual operation of the screw 36 to provide for minor adjustments of the compensation slide 26.

The main control 46 feeds a pattern of electrical pulses through a cable 47 to the main stepping motor and, at the same time, through the cable 48 to a control panel. At one side of the panel is located a visual SLIDE POSITION indicator 51 which shows the cross-slide position at any given time. Also, mounted on the panel is a NEW WHEEL lamp 53, a COARSE COMPENSATION device 54 and lamp 55, a CYCLE START device 56 and lamp 57, and a WORN WHEEL device 58 and lamp 59.

Figure 2:
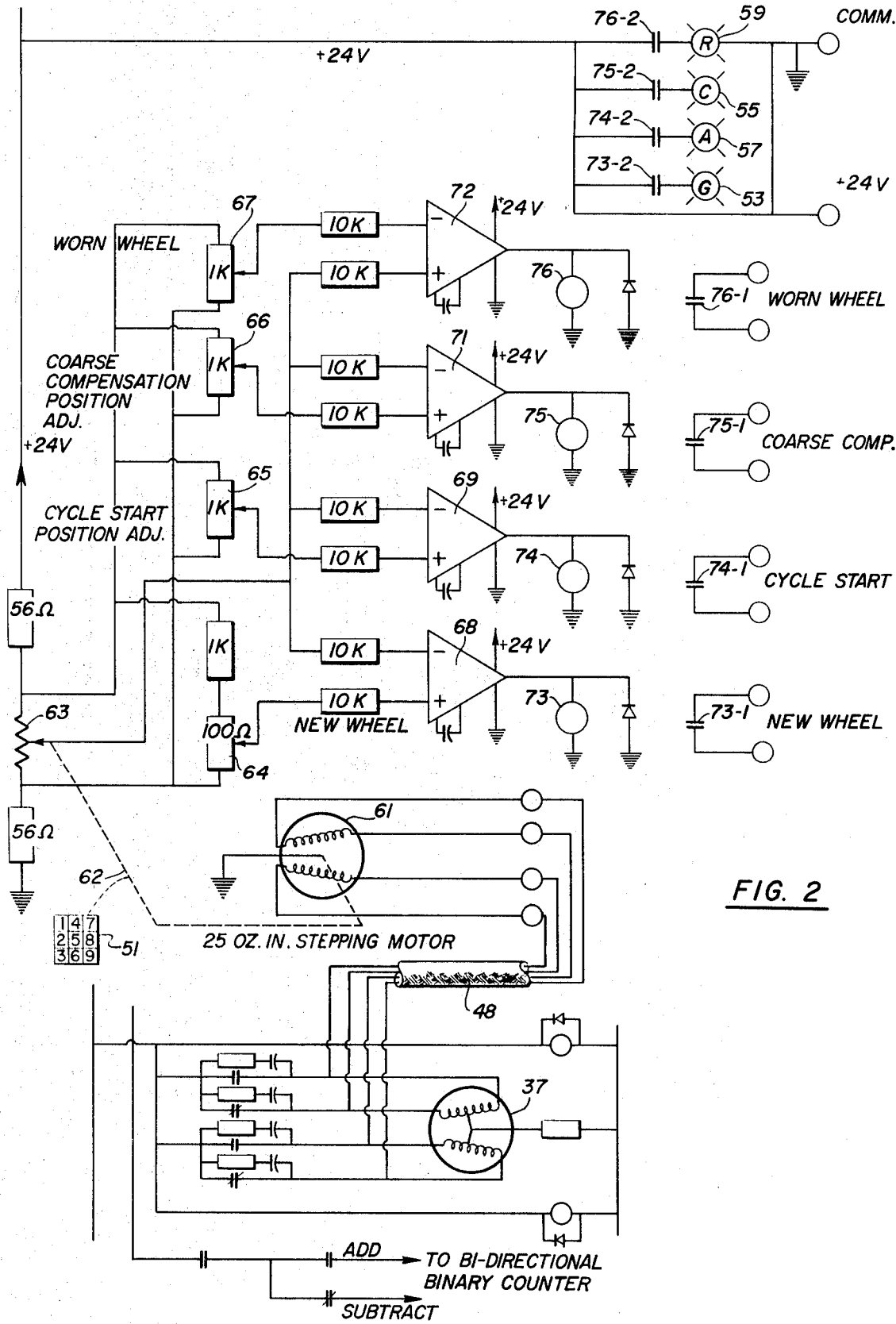
FIG. 2 is an electrical schematic of important portions of the machine.

Referring now to FIG. 2, a secondary stepping motor 61 is mounted on the back of the panel and has a shaft 62 connected to a long potentiometer 63; this is a special potentiometer having an extremely long resistance element wound in helical form and having a contact element that slides along the helix. The shaft 62 also drives the SLIDE POSITION counter 51. Four potentiometers 64, 65, 66, and 67 are provided and the last three are operated by the devices 54, 56, and 58, respectively. Four operational amplifiers 68, 69, 71, and 72 are connected to these potentiometers and, in turn, are connected to the coils of relays 73, 74, 75, and 76, respectively. Each operational amplifier is operated as a voltage comparator; the center contact of the potentiometer 63 is connected to all of the amplifiers, while the amplifier 68 is connected to the center contact of the NEW WHEEL potentiometer, the amplifier 69 to the CYCLE START potentiometer 65, the amplifier 71 to the COARSE COMPENSATION potentiometer 66, and the amplifier 72 to the WORN WHEEL potentiometer 67. When the value of the voltage from the potentiometer 63 equals or exceeds the other "set" voltage on a given amplifier, it causes current to flow through its relay coil.

The relay 73 when energized closes a normally-open contactor 73–1 which sets the new wheel cycle operating and also closes a normally-open switch 73–2 which actuates the lamp. Similarly, the relay 74 when energized closes a normally-open contactor 74–1 which operates the cycle start and closes a normally-open switch 74–2 which turns on the CYCLE START lamp 57. The relay 75 closes a normally-open contactor 75–1 which brings about coarse compensation and closes a normally-open switch 75–2 which lights the COARSE COMPENSATION lamp 55. The relay 76 closes a contactor 76–1 to operate the worn wheel portion of the cycle and closes the switch 76–2 to light the lamp 59.

The operation of the machine will now be readily understood in view of the above description. The grinding cycle takes place in the usual way, i.e., a new wheel is placed on the spindle 34, the raw wheel is dressed down to a standard size, the regular grinding cycles are started on a succession of workpieces, the cycles continue with occasional dressing until the wheel diameter is reduced to the worn wheel size at which time a new wheel is mounted on the spindle. As the negative and positive pulses are introduced to the main stepping motor 37 to move the wheelhead table 25 back and forth during the successive grinding cycles, the secondary stepping motor 61 is rotating in synchronization with the main motor. The count on the indicator 51 is set at zero at the beginning and the number appearing changes with the addition and subtraction of pulses and always shows the position of the cross-slide by what might be called "dead reckoning." At the same time, the contact member of the potentiometer 63 slides back and forth along the resistance element, so that its output voltage also is representative of the position of the cross-slide. After the slide has been returned to "zero" and the new raw wheel has been mounted on the spindle, the abrasive wheel 35 is dressed several times until a standard size or diameter is reached. After each dressing pass, an advance or "compensation" of the wheel toward the dressing diamond, so that the next dressing pass removes an amount from the wheel radius equal in amount to the compensation. In accordance with the present invention, a compensation is used at this "new wheel" portion of the grinding machine operation that is much larger than is used in the normal grinding cycles. This coarse compensation is set into the machine in the COARSE COMPENSATION device 54 on the panel 49. This coarse compensation continues until the CYCLE START position is reached, i.e., the count set-up on the device 56 is reached. The regular grinding cycles then start and, as the wheel diameter is reduced by successive occasional dressing (using a small compensation, of course), the cross-slide eventually works its way back to the point where the count previously set on the WORN WHEEL device 58 is reached. The grinding cycles are then termined and the cross-slide is moved forward to the zero position for a wheel change.

It can be seen that the various change points in the overall operations of the grinding machine can be readily changed. This is done by simply rotating the numbered discs in the NEW WHEEL potentiometer 64, the COARSE COMPENSATION device 54, the CYCLE START device 56, and the WORN WHEEL device 58 to the desired numerical reading or setting. The setting of any of these control devices can be made when the machine is not operating or while it is operating. The adjustment can be made quickly and accurately, the accuracy being to that degree determined by the movement afforded by the screw 36 when a single pulse is applied to the main motor. In a practical embodiment of the invention, each digit on the counters has to do with .001" on the cross-feed. The operator always knows by observing the read-out counter or SLIDE POSITION indicator 51 how much wheel he has used and when to expect a WORN WHEEL signal on the lamp 59.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:
1. A grinding machine, comprising
  (a) base on which are mounted a workhead and a wheelhead,
  (b) feed means including a main stepping motor and a screw for producing relative movement between the workhead and the wheelhead,
  (c) control means for introducing electrical pulses to the stepping motor to produce a grinding cycle,
  (d) a secondary stepping motor also connected to the control means to receive the same electrical pulses as the main stepping motor,
  (e) a counter driven by the secondary stepping motor, and
  (f) switches operated by the counter for operation at predetermined counts.

2. A grinding machine as recited in claim 1, wherein the switches include a NEW WHEEL switch, a COARSE COMPENSATION switch, a CYCLE START switch, and a WORN WHEEL switch.

3. A grinding machine as recited in claim 1, wherein the count at which each switch operates is adjustable.

4. A grinding machine as recited in claim 1, wherein a control panel is provided with a visual numerical indicator showing the relationship between the workhead and the wheelhead, wherein the indicator is driven from the secondary stepping motor, and wherein each switch is provided with a visual numerical adjustor located on the panel for determining the count at which that switch operates.

5. A grinding machine as recited in claim 1, wherein the said counter is an extremely long potentiometer and the voltage across that potentiometer is indicative of the pulse count, and wherein each switch is formed by a relay whose coil is energized by an operational amplifier when the potentiometer voltage reaches a predetermined value.

6. A grinding machine as recited in claim 1, wherein the counter is a potentiometer having a contact member which is moved along a resistance element by the secondary stepping motor to give a voltage which at all times is representative of the dimensional relationship between the wheelhead and the workhead.

7. A grinding machine as recited in claim 6, wherein each switch comprises an adjustable potentiometer giving a voltage proportional to a predetermined setting, the voltage from each switch potentiometer being continually compared with the voltage from the counter potentiometer, each switch having a relay that is energized when the counter potentiometer voltage reaches or exceeds the set switch potentiometer voltage.

References Cited
UNITED STATES PATENTS

| | | | |
|---|---|---|---|
| 2,771,714 | 11/1956 | Schmidt et al. | 51—48 |
| 3,353,302 | 11/1967 | Lowy | 51—165X |
| 3,403,480 | 10/1968 | Robillard | 51—165 |

LESTER M. SWINGLE, Primary Examiner